United States Patent [19]

Parker

[11] Patent Number: 4,766,646

[45] Date of Patent: Aug. 30, 1988

[54] POULTRY PROCESSING

[75] Inventor: David A. Parker, Hull, England

[73] Assignee: BP Chemicals Limited, London, England

[21] Appl. No.: 53,377

[22] Filed: May 22, 1987

[30] Foreign Application Priority Data

May 28, 1986 [GB] United Kingdom ............... 8612954

[51] Int. Cl.$^4$ ............................................. A22C 21/04
[52] U.S. Cl. ........................................ 17/51; 17/11.2; 17/47
[58] Field of Search ................... 17/1 D, 11.2, 47, 51

[56] References Cited

U.S. PATENT DOCUMENTS 4,220,661 9/1980 Huitson ............................. 424/317

FOREIGN PATENT DOCUMENTS 2542891 3/1977 Fed. Rep. of Germany ....... 17/11.2

Primary Examiner—Willie G. Abercrombie
Attorney, Agent, or Firm—Brooks, Haidt, Haffner & Delahunty

[57] ABSTRACT

This invention relates to a method of eliminating infection of poultry by undesirable microorganisms such as salmonella during processing. The method consists of dipping the poultry carcass prior to plucking into scald water containing an effective amount of an acid polyformate salt.

6 Claims, No Drawings

POULTRY PROCESSING

The present invention relates to an improvement to poultry processing by incorporating an additive in the scald-water used during said processing.

It is well known that during the processing of poultry, the bird after it has been killed and bled is passed through a scald-water tank maintained at a temperature of e.g. 50°-60° C. This treatment loosens the feathers before the next processing stage which is plucking.

It has been observed by poultry processors that at the start of a normal working day for processing poultry the number of microorganisms found on the poultry before the scald water treatment is significantly reduced after such treatment. However, as the day progresses this reduction in numbers from the pre- to post-treatment becomes insignificant due to the build up of microorganisms in the scald-water. The increased bacterial load on carcasses entering the plucking machines brings about an increased contamination of the skin of the plucked bird.

It is well known that bacteria attached to the bird's skin are more heat resistant than those in the free state. Thus any bacteria surviving the scald-water treatment are very difficult to remove during subsequent processing (cf. Article by Notermans, S. et al in British Poultry Science, 1975, 16, pp 351–361).

One of the most dangerous infections of this type is salmonellosis caused by *Salmonella typhimurium*. Another type of microorganism is *Campylobacter jejuni*. Recent surveys have also shown that the incidence of food poisoning outbreaks associated with *Campylobacter jejuni* has increased significantly over the past few years.

Since these microorganisms are also to be found in scald-water it is necessary to minimise the effects of these organisms. Many attempts have been made to reduce the microbiological contamination of poultry carcasses, especially the incidence of salmonella contamination. The use of chlorine has been effective but suffers from the disadvantage of off-odours, undesirable flavours and colouration of the products.

Control by decontamination of the end product has also been suggested. However, this introduces a further processing stage and the effectiveness of this method is not proven. Again the proposed use of lactic acid, while effective, not only causes undesirable colouration of the product at concentrations above 0.25% but also adversely affects the texture of the meat if added to the scald-water.

Increasing the pH of the scald-water to about 9 has also been suggested. Although, at the normal scalding times of 2.5-4 minutes, this treatment reduces the number of potential pathogens, it fails to eliminate them (cf. Article by Humphrey, T. J. et al in J. of Applied Bacteriology, 1984, 57, pp 355–359).

It has now been found that these undesirable microorganisms can be substantially eliminated by the use of an acid formate salt in the scald-water tank.

Accordingly, the present invention is a method of processing of poultry which processing comprises the step of dipping the poultry carcass into a scald water tank prior to plucking, characterised in that the scald water contains an effective amount of an acid polyformate salt.

By "acid polyformate salt" is meant here and throughout the specification that in the salt the chemical equivalent ratio of the formate anion to a cation other than hydrogen is at least 4:1.

The acid polyformate is preferably ammonium tetraformate.

The effective amount of acid polyformate used will depend upon the type of and quality of birds to be treated and the temperature of the scald water. Thus for a scald water temperature of 50°-60° C., the amount of acid polyformate salt used is suitably from 0.002 to 0.5% by weight of the water in the tank, preferably from 0.005 to 0.2% by weight.

It will be understood by those skilled in the art that the acid polyformate need not be added to the scald water tank as a preformed salt. It could, for instance be added as two or more reactant components which together give rise to a concentration and ratio of cation to anion corresponding to that of the acid polyformate salt in situ in the scald water.

By using the additives as in the present invention, it was found that, at appropriate concentrations, these additives were effective even in the presence of other organic material which had hitherto adversely affected the techniques previously used. Also the microorganisms were substantially eliminated in the scald water.

The present invention is further illustrated with reference to the following Examples:

Preliminary Evaluation of Ammonium Tetraformate (ATF) as a potential Scald-water Additive for Poultry The following work was carried out under laboratory conditions.

A strain of *Campylobacter jejuni*, biotype 2, originally isolated from a chicken, was subjected to various concentrations of ATF when held at 50° C. for 3 minutes to simulate the soft scalding process used commercially.

Initially, tests were made using plain water and the percentage reduction in the number of campylobacters was calculated in each case. The experiment was repeated with the addition of 1% horse blood or skim-milk to provide 'organic loading' analagous to that occurring in natural scald-water.

All tests were repeated four times and in each case the mean reduction in count is expressed as a percentage:

| Conc. of ATF (ppm) | Plain Water | With Organic Loading |
| --- | --- | --- |
| 5 | 30.82 | 12.90 |
| 10 | 38.34 | 25.87 |
| 25 | 99.92 | 38.34 |
| 50 | >99.99 | 96.37 |
| 100 | >99.99 | >99.99 |

The above reductions were calculated after allowing for the effects of heat alone, i.e. 50° C./3 min, and therefore are solely attributable to the activity of ATF itself.

The above results show that ATF was effective in killing *C. jejuni* at relatively high dilutions and that organic materials at a level of up to 1% had only a slight effect in reducing the activity of ATF.

Effect of Ammonium Tetraformate (ATF) at 50° C. for 3 minutes on *Salmonella agona*

The procedure described above was again used except that *Salmonella agona* replaced *Campylobacter jejuni* as the test organism. The results are expressed as the mean percentage reduction in count:

| Conc. of ATF (ppm) | Plain Water | With Organic Loading |
| --- | --- | --- |
| 100 | 17.9 | 17.5 |
| 250 | 30.1 | 45.0 |
| 500 | 66.3 | 84.1 |
| 1000 | >95.0 | >95.0 |

The above percentage reductions were calculated after allowing for the effects of heat alone, i.e. 50° C./3 minutes, and therefore are solely attributable to the activity of ATF itself.

I claim:

1. A method of processing poultry which processing comprises the step of dipping the poultry carcass into a scald water tank prior to plucking, characterised in that the scald water contains an effective amount of an acid polyformate salt.

2. A method according to claim 1 wherein the acid polyformate salt is ammonium tetraformate.

3. A method according to claim 1 wherein the scald water temperature is from 50°–60° C.

4. A method according to claim 1 wherein the acid polyformate salt is present in the scald water in an amount from 0.002–0.5% w/w of the water.

5. A method according to claim 1 wherein the acid polyformate is added to the scald water as a preformed salt.

6. A method according to claim 1 wherein two or more reactant components are added to the scald water which together give rise to a concentration and ratio of cation to anion corresponding to that of the acid polyformate salt in situ in the scald water.

* * * * *